US012017765B2

United States Patent
Bianco Mengotti et al.

(10) Patent No.: US 12,017,765 B2
(45) Date of Patent: Jun. 25, 2024

(54) CONVERTIPLANE AND ASSOCIATED FOLDING METHOD

(71) Applicant: LEONARDO S.P.A., Rome (IT)

(72) Inventors: Riccardo Bianco Mengotti, Samarate (IT); Matteo Pizzagalli, Samarate (IT); Carlo Cassinelli, Samarate (IT); Paolo Brughera, Samarate (IT); Luca Sampugnaro, Samarate (IT)

(73) Assignee: LEONARDO S.P.A., Rome (IT)

( * ) Notice: Subject to any disclaimer, the term of this patent is extended or adjusted under 35 U.S.C. 154(b) by 142 days.

(21) Appl. No.: 17/786,210

(22) PCT Filed: Dec. 17, 2020

(86) PCT No.: PCT/IB2020/062124
§ 371 (c)(1),
(2) Date: Jun. 16, 2022

(87) PCT Pub. No.: WO2021/124211
PCT Pub. Date: Jun. 24, 2021

(65) Prior Publication Data
US 2023/0017806 A1 Jan. 19, 2023

(30) Foreign Application Priority Data
Dec. 17, 2019 (EP) .................... 19217237

(51) Int. Cl.
*B64C 3/56* (2006.01)
*B64C 29/00* (2006.01)
(52) U.S. Cl.
CPC ............ *B64C 3/56* (2013.01); *B64C 29/0033* (2013.01)
(58) Field of Classification Search
CPC ....... B64C 3/56; B64C 3/546; B64C 29/0033; B64C 27/28; B64U 20/50; B64U 30/297
See application file for complete search history.

(56) References Cited

U.S. PATENT DOCUMENTS

| 4,691,878 A | 9/1987 | Vaughan |
| 8,387,913 B2 | 3/2013 | Karem |

(Continued)

FOREIGN PATENT DOCUMENTS

| CN | 108177760 A | * | 6/2018 |
| EP | 3296201 B |   | 3/2018 |

(Continued)

OTHER PUBLICATIONS

International Search Report and Written Opinion in corresponding International Patent Application No. PCT/IB2020/062124 mailed Feb. 19, 2021 (16 pages).

*Primary Examiner* — Philip J Bonzell
*Assistant Examiner* — Colin Zohoori
(74) *Attorney, Agent, or Firm* — Leason Ellis LLP

(57) ABSTRACT

A method is described for the folding of a convertiplane with a fuselage having a first axis, a pair of wings and a pair of rotors arranged on respective mutually opposite sides of the respective wings; each rotor comprises a mast rotatable about a second axis and a plurality of blades; each wing comprises a first portion fixed with respect to the fuselage; a second tip portion opposite to the first portion; and a third intermediate portion, which is interposed between the associated first portion and second tip portion; the mast of each rotor is integrally tiltable with the second axis and associated second tip portion about a third axis transversal to the second axis and the fuselage so as to set said convertiplane between a helicopter configuration and an aeroplane configuration; the method comprises the steps i) of arranging the convertiplane in the helicopter configuration and ii) rotating a pair of assemblies of respective wings with respect to the fuselage and the associated first portion about respective fifth axes, so as to arrange the convertiplane in a stowage configuration.

A convertiplane is also disclosed.

4 Claims, 15 Drawing Sheets

(56) References Cited

U.S. PATENT DOCUMENTS

| | | |
|---|---|---|
| 10,343,762 B2 | 7/2019 | Ross et al. |
| 10,676,187 B2 * | 6/2020 | Bernhardt ................. B60F 5/00 |
| 2004/0026563 A1 * | 2/2004 | Moller .................... B64C 11/48 |
| | | 244/12.4 |
| 2014/0061392 A1 | 3/2014 | Karem |
| 2018/0079487 A1 | 3/2018 | Ivans et al. |
| 2018/0257772 A1 | 9/2018 | Bernhardt |
| 2018/0312251 A1 | 11/2018 | Petrov |
| 2021/0031911 A1 * | 2/2021 | Sinha ........................ B64C 3/10 |
| 2022/0097837 A1 * | 3/2022 | Mehrgan .................. B64C 3/56 |
| 2022/0135204 A1 * | 5/2022 | Mehrgan ............. B29C 29/0033 |
| | | 244/49 |
| 2022/0315216 A1 * | 10/2022 | Kaplinsky ................. B60F 5/02 |
| 2022/0371728 A1 * | 11/2022 | Hirabayashi ........ B64C 29/0008 |

FOREIGN PATENT DOCUMENTS

| | | |
|---|---|---|
| EP | 3299280 A | 3/2018 |
| EP | 3299729 B | 3/2018 |

\* cited by examiner

CONVERTIPLANE AND ASSOCIATED FOLDING METHOD

CROSS REFERENCE TO RELATED APPLICATIONS

This patent application is a U.S. National Phase Application under 35 U.S.C. § 371 of International Patent Application No. PCT/IB2020/062124, filed on Dec. 17, 2020, which claims priority from European patent application no. 19217237.7 filed on Dec. 17, 2019, the entire disclosure of which is incorporated herein by reference.

TECHNICAL FIELD

The present invention relates to a convertiplane and an associated folding method.

BACKGROUND ART

In the aviation industry, aeroplanes are normally used for high cruising speeds with respect to the normal performance of an ordinary helicopter, especially above 150 knots and at high altitudes, for example above 30,000 feet. For high cruising speeds and altitudes, aeroplanes use fixed wings to generate the lift necessary for sustaining the aeroplane in the air. A sufficient amount of lift can only be achieved by accelerating the aeroplane on quite long runways. These runways are also needed to allow aeroplanes to land.

Contrariwise, helicopters generate the necessary lift through rotation of the main rotor's blades. In consequence, helicopters can take-off/land without the need for horizontal speed and using particularly small areas. Moreover, helicopters are capable of hovering and of flying at relatively low altitudes and speeds, thereby being particularly easy to handle and suitable for demanding manoeuvres, such as mountain or sea rescue operations for example.

Nevertheless, helicopters have intrinsic limits regarding the maximum operating altitude, which is around 20,000 feet and the maximum operating speed, which cannot exceed approximately 150 knots.

In order to meet the demand for aircraft capable of having the same maneuverability and flexibility of use of the helicopter and, at the same time, overcome the intrinsic limits indicated above, convertiplanes are known.

In greater detail, known types of convertiplane basically comprise:
- a fuselage extending along a first longitudinal axis;
- wings projecting in a cantilever fashion from respective opposite sides of the fuselage and having respective free ends opposite to the fuselage and aligned along a second transversal axis substantially orthogonal to the first longitudinal axis;
- a pair of nacelles housing respective engines; and
- a pair of rotors rotatable about respective third axes and operatively connected to the respective engines.

The rotors are tiltable with respect to the wings about a fourth axis parallel to the second axis.

Each rotor comprises, in a known manner, a mast rotatable about an associated third axis and a plurality of blades hinged to the mast, in particular angularly equispaced around the free end of the mast, which protrudes from the respective nacelle.

More specifically, the blades of each rotor extend along respective longitudinal axes, which are transversal to the associated third axis.

The rotors are connected together by an interconnection shaft, which ensures the operation of both rotors in the event of failure of one of the engines.

Convertiplanes are also able to selectively assume:
- an "aeroplane" configuration, in which the rotors are arranged with the respective third axes substantially parallel to the first axis of the convertiplane; or
- a "helicopter" configuration, in which the rotors are arranged with the respective third axes substantially vertical and transversal to the first axis of the convertiplane.

Due to the possibility of tilting the rotors, convertiplanes are able to take off and land like a helicopter, i.e. in a direction substantially perpendicular to the first longitudinal axis of the convertiplane, without the need of a runway.

Furthermore, convertiplanes are able to take off and land on rough terrain or ground not normally prepared for such manoeuvres.

In addition, convertiplanes are capable of hovering when in the "helicopter" configuration.

Convertiplanes can also reach and maintain cruising speeds of approximately 250-300 knots and flight altitudes of up to approximately 20,000 feet when in the "aeroplane" configuration.

This cruising speed is much higher than the roughly 150 knots defining the maximum cruising speed for helicopters.

Similarly, the aforementioned altitude is much higher than that typical of helicopters and enables convertiplanes in the "aeroplane" configuration to avoid bad weather at lower altitudes.

There is awareness in the industry of the need to reduce the space occupied by convertiplanes, so as to enable efficient stowage, for example inside a ship.

To this end, convertiplanes are known that are equipped with a stowage system, which cause the rotation of the entire wing with respect to the fuselage, in a non-operational condition of the convertiplane.

This known solution is, for example, illustrated in U.S. Pat. No. 5,337,974 and in the Osprey V22 convertiplane.

In greater detail, the Osprey V22 convertiplane has the wing hinged to the fuselage about its fifth median axis, which is orthogonal to the first and second axes and oriented in a high-low direction when the convertiplane is on the ground.

In addition, the rotors blades of the Osprey V22 convertiplane are rigidly foldable about respective sixth axes parallel to the third axis of the corresponding rotor.

Starting from a helicopter configuration in which the wings are arranged conventionally with their second axis orthogonal to the first axis of the fuselage, the aforementioned convertiplane is arranged in the stowage configuration through the following operations.

First of all, the blades of the rotors are folded about the respective sixth axes so as to so as to have their longitudinal axes parallel to each other, parallel to the second axis of the wing and parallel to the fourth axis.

More specifically, the blades are folded so as to extend from the rotor towards the fuselage.

Then, the wings and the rotors with the folded blades are integrally rotated about the second axis to be arranged in the aeroplane configuration.

Finally, the wings and the folded rotors are integrally rotated about the fifth axis so as to reach the stowage configuration, in which the wings are arranged parallel to the fuselage and the rotors with the folded blades all arranged substantially parallel to the fuselage. In particular, the blades of the first rotor are arranged facing the blades of the second rotor.

EP-B-3299729, U.S. Pat. No. 10,343,762, US-A-2018/0079487 and EP-A-3299280, U.S. Pat. No. 4,691,878 and EP-B-3296201 describe convertiplanes provided with one-piece wings, which:

rotate about the fifth axis with respect to the fuselage, when the convertiplane is being set in the stowage configuration; and are arranged orthogonally with respect to the fuselage, when convertiplane reaches the stowage configuration.

The rotation of the entire wing about the fuselage makes the operation of arranging the convertiplane in the stowage configuration particularly complex and difficult.

In addition, the rotation of the wings imposes substantial design constraints on the convertiplane's configuration, which must be such as to avoid any interference of the wings with the tail portion in the stowage configuration.

There is therefore awareness in the industry of the need to simplify as far as possible the operations necessary for arranging the convertiplane in the stowage configuration.

There is also awareness in the industry of the need to contain as far as possible the overall space occupied of the convertiplane in the stowage configuration, for the same volume of the convertiplane in the operative helicopter and aeroplane configurations.

Finally, there is awareness of the need to limit the loads to be handled during the transition to the stowage configuration so as to make said transition as easy as possible.

U.S. Pat. No. 8,387,913 describe a system that allows folding the wing of an aeroplane so as to reduce the space occupied in a stowage configuration.

Similarly, the VIKING S-3 aircraft uses a folding system for the wings and tail fin.

These teachings are not applicable to convertiplanes, as the latter must generally be folded from the "helicopter" configuration. This is necessary because the size of the blades radially to the respective third axes of the rotors is so large that they would interfere with the ground when the convertiplane is in the "aeroplane" configuration.

DISCLOSURE OF INVENTION

The object of the present invention is the manufacture of a convertiplane that enables satisfying at least one of the above-specified needs in a simple and inexpensive manner.

According to the invention, this object is achieved by a method of folding a convertiplane as claimed in claim 1.

The present invention also relates to a convertiplane, as defined in claim 8.

BRIEF DESCRIPTION OF THE DRAWINGS

For a better understanding of the present invention, three non-limitative embodiments of a convertiplane and five preferred non-limitative embodiments of an associated folding method are described hereinafter, purely by way of example and with the aid of the accompanying drawings, in which.

BEST MODE FOR CARRYING OUT THE INVENTION

Figure 1:
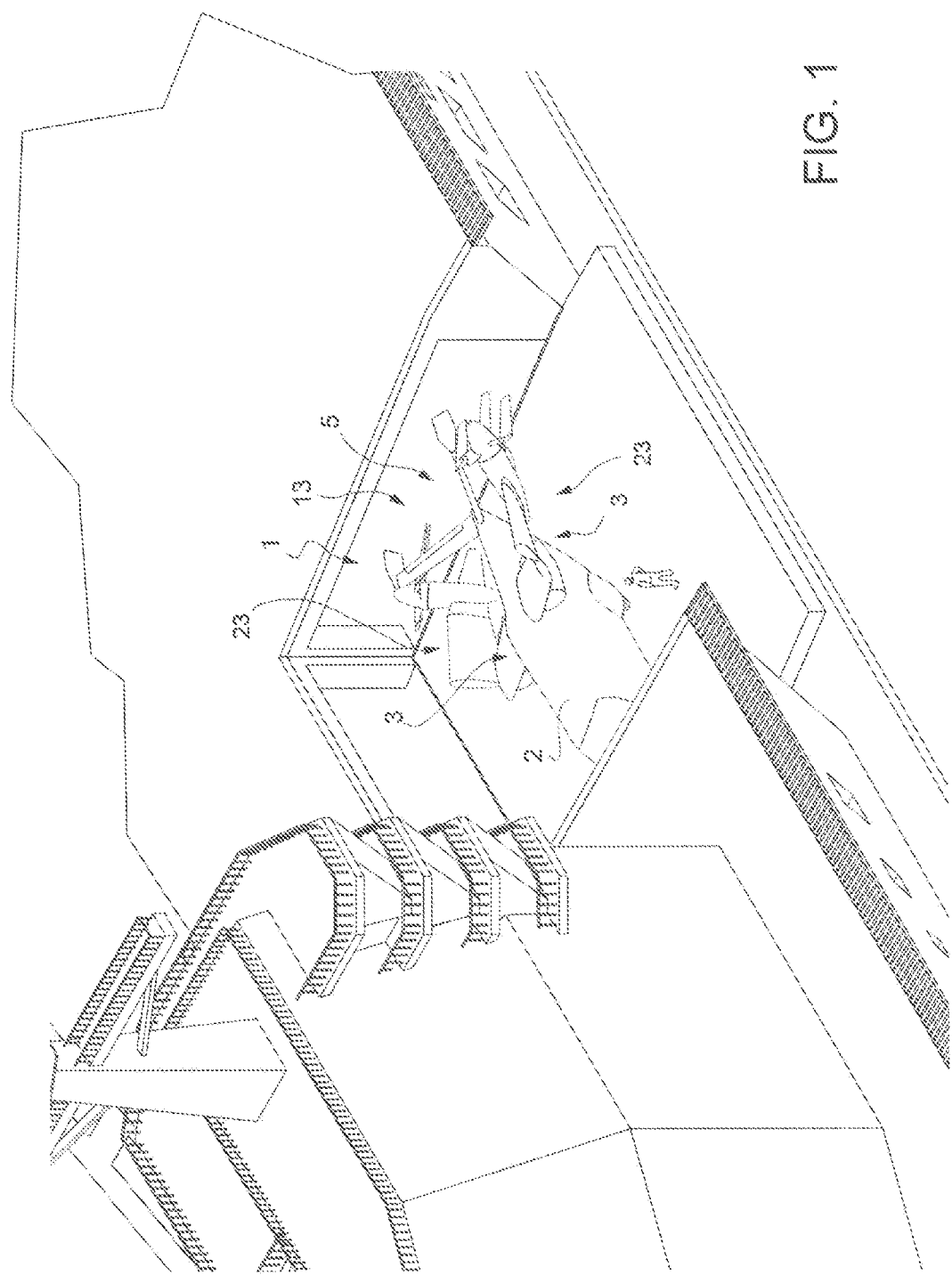
FIG. 1 is a perspective view of a first embodiment of a convertiplane made according to the principles of the present invention and arranged in a stowage configuration.

Referring to FIGS. 1 to 13, reference numeral 1 indicates an aircraft capable of hovering, in particular a convertiplane.

The convertiplane 1 basically comprises:
a fuselage 2 having an axis A of longitudinal extension;
a pair of cantilever wings 3 extending from respective mutually opposite sides of the fuselage 2 and transversely to axis A;
a pair of engines 4 carried by respective wings 3; and
a pair of rotors 5 operatively connected to the respective engines 4 and rotatable about respective axes B.

In the case shown, the engines 4 are arranged below the respective wings 3.

Preferably, the engines 4 are each arranged in a respective intersection area of the corresponding wing 3 with the fuselage 2.

In the case shown, each engine 4 is positioned below the respective wing 3 and laterally to the fuselage 2 of the convertiplane 1.

Alternatively, and in a manner not shown, each wing 3 of the convertiplane 1 has at least one engine 4 installed on a respective top surface 48.

Alternatively, and in a manner not shown, each wing 3 of the convertiplane 1 has at least one engine 4 installed on a respective bottom surface 49.

Alternatively, and in a manner not shown, the fuselage 2 of the convertiplane 1 has at least one engine 4 installed on its own top surface 100 and on a longitudinal plane P of symmetry of the convertiplane 1.

Alternatively, and in a manner not shown, at least one engine 4 is housed at least partially inside the fuselage 2, preferably on a longitudinal plane P of symmetry of the convertiplane 1. In consequence, the rotors 5 would be operatively connected to the engine 4, for example, by a mechanical power transmission.

Figure 2:
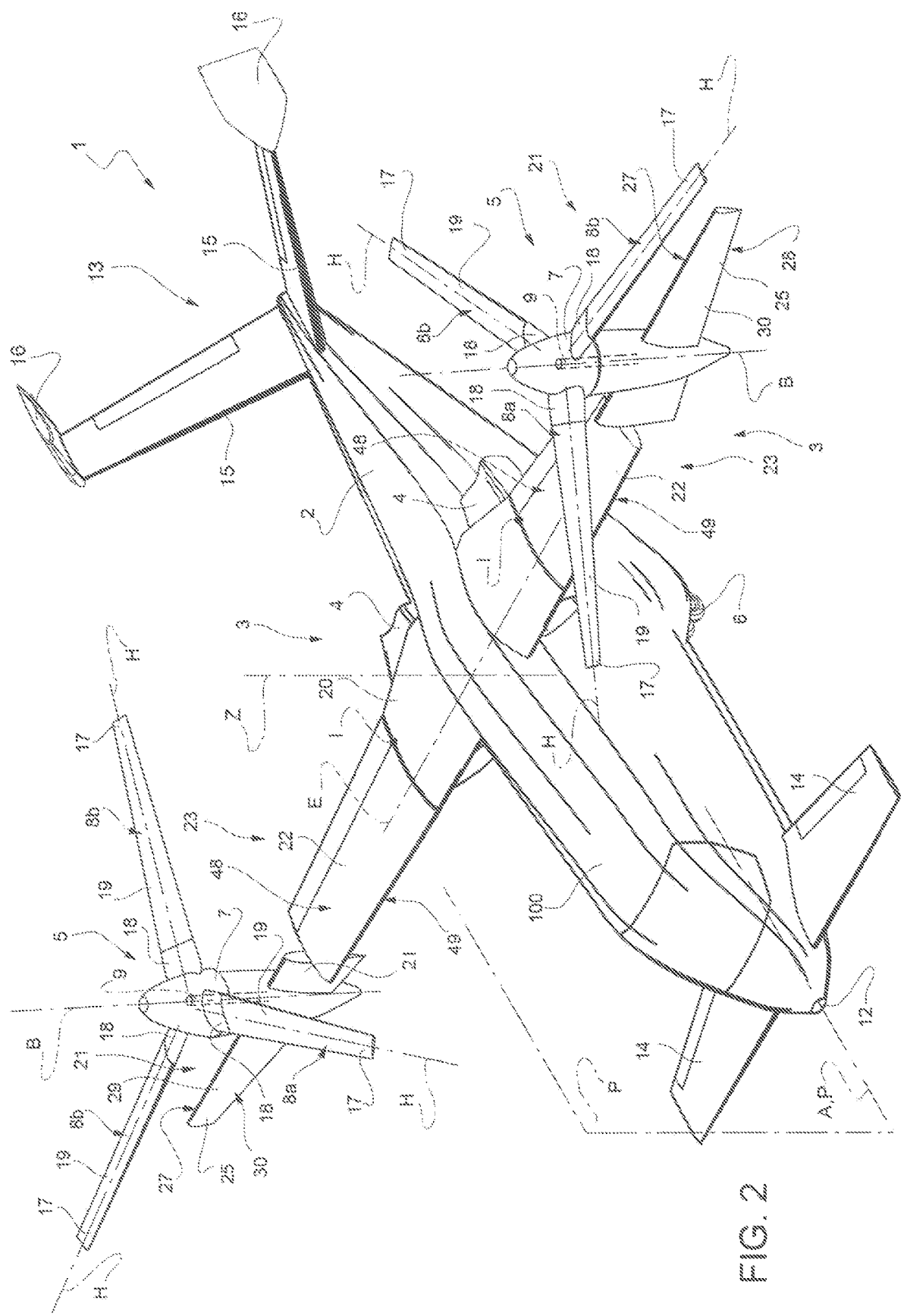
FIG. 2 is a perspective view of the convertiplane in FIG. 1 in the helicopter configuration.
Figure 3:
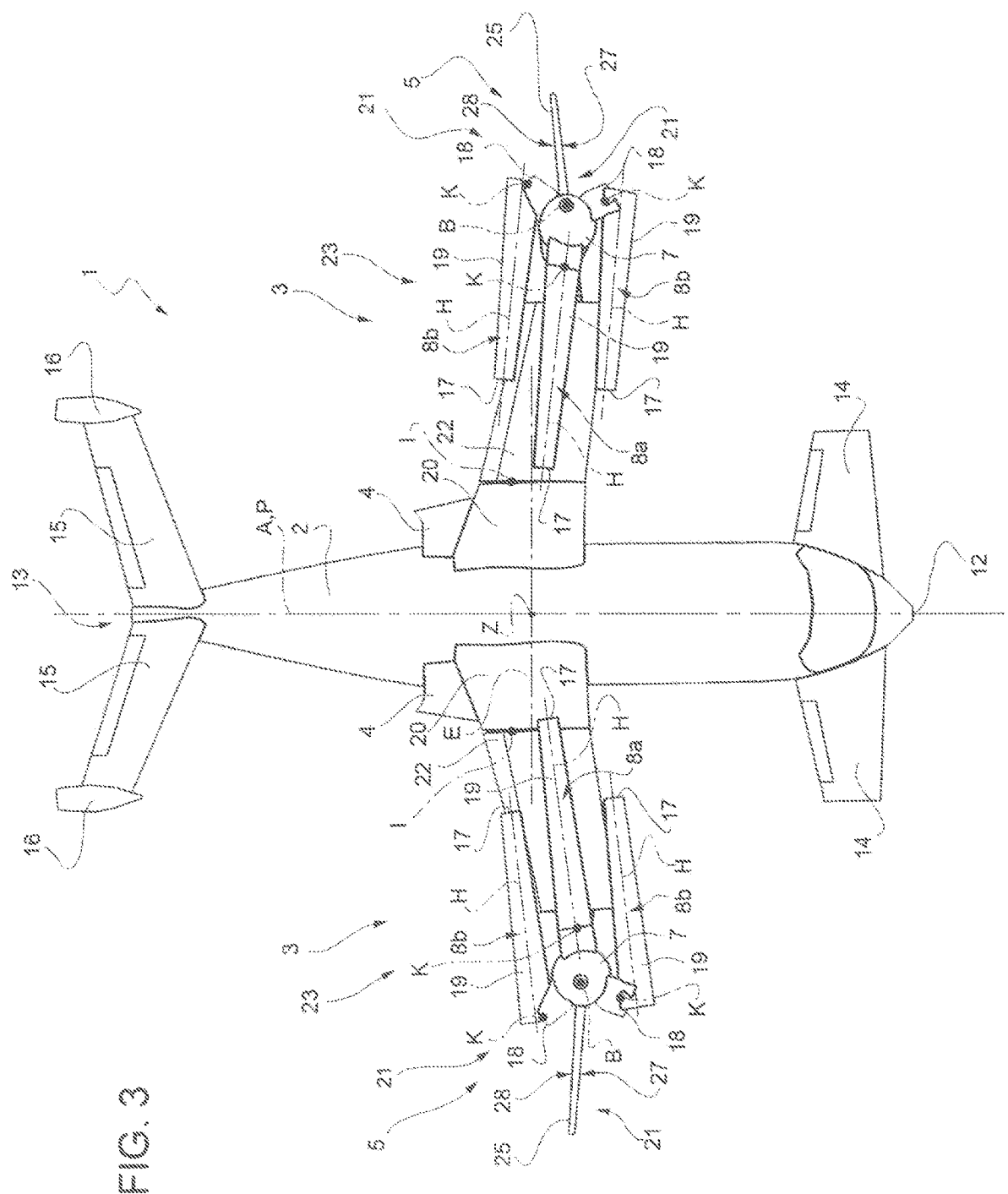
FIG. 3 is a plan view of the convertiplane in FIGS. 1 and 2 during a first operating step of a first embodiment of the associated folding method.

The convertiplane 1 further comprises a plurality of undercarriages 6 arranged below the fuselage 2 with reference to a normal operating position of the convertiplane 1 shown in FIG. 2.

The fuselage 2 also comprises a nose 12 arranged at the front and a tail portion 13, opposite each other along the axis A.

The convertiplane 1 also comprises an axis E transversal to axis A.

In the case shown, axis E is orthogonal to axis A and arranged horizontally in a plan view of the convertiplane 1.

Alternatively, the convertiplane 1 comprises a pair of axes E associated with respective wings 3 arranged in the "aeroplane" or "helicopter" configurations. Each axis E is parallel to the median line of the corresponding wing 3 and could form a dihedral with respect to the fuselage 2, in the "aeroplane" or "helicopter" configurations.

Each aforementioned median line extends equidistantly from the leading and trailing edges of the respective wing 3.

Each wing 3 develops lift along an axis Z orthogonal to axes A and E.

The convertiplane 1 also comprises a pair of canards 14 projecting in a cantilever fashion from respective mutually opposite sides of the fuselage 2, at the nose 12.

In the case shown, the canards 14 are arranged on a lower part of the nose 12. In a different embodiment of the present invention, not shown in the accompanying figures, the canards 14 are arranged at an upper portion of the nose 12 of the convertiplane 1.

The canards 14 perform the function of horizontal stabilizers.

The tail portion 13 of the convertiplane 1 also comprises a pair of surfaces 15 arranged in a V, inclined to each other and symmetrical with respect to axis A.

Each surface 15, in turn, comprises a fin 16 transversal to the respective surface 15, orthogonal in the case shown, and extending from both sides of the respective surface 15.

Preferably, surfaces 15 define an angle between them ranging from 40 to 50 degrees, preferably 45 degrees.

In this way, surfaces 15 of the convertiplane 1 develop a substantial aerodynamic force along the axis Z orthogonal to axes A and E.

Alternatively, the tail portion 13 could be shaped like an H, I, M, T or cross.

In particular, the size in plan of the tail portion 13, independently of its geometric shape, is equal to at least 5%, preferably 10%, of the overall size of the wing 3 parallel to axis E and seen from above in plan.

In greater detail, each wing 3 comprises:
- a portion 20 extending along an axis E orthogonal to axis A and fixed with respect to the fuselage 2;
- a tip portion 21 supporting the respective rotor 5 and the respective nacelle 10, and defining an aerodynamic surface 25; and
- an intermediate portion 22, which is interposed between the respective portion 20 and the respective tip portion 21.

The convertiplane 1 can be selectively arranged:
- in a "helicopter" configuration (shown in FIG. 2), where the axes B of the rotors 5 are orthogonal to axis A and axis E; and
- in an "aeroplane" configuration (not shown in the accompanying figures), where the axes B of the rotors 5 are parallel to axis A and orthogonal to axis E.

Preferably, each portion 20 supports the associated engine 4.

Each tip portion 21 and the associated rotor 5 are tiltable about axis E integrally with the associated rotor 5, so as to allow the transition of the convertiplane 1 between the "helicopter" configuration and the "aeroplane" configuration.

Each portion 20 and the respective intermediate portion 22 are integral with each other and extend along the axis E when the convertiplane 1 is in the "helicopter" configuration, in the "aeroplane" configuration and during the transition of the convertiplane 1 between the "helicopter" configuration and the "aeroplane" configuration.

Each tip portion 21 comprises a respective free end.

In greater detail, each tip portion 21 comprises, proceeding from the respective portion 22 from the side opposite to axis A and along the axis E in the "aeroplane" or "helicopter" configurations, a section adjacent to the respective portion 22, the respective rotor 5 with the respective nacelle 10 and the respective free end.

When the convertiplane 1 is in the "aeroplane" configuration, the surfaces 25 define respective extensions of portion 20 and the respective intermediate portions 22.

Each surface 25 comprises:
- a leading edge 27 and a trailing edge 28 opposite to each other; and
- a top surface 29 and a bottom surface 30 extending on opposite sides from each other between the respective leading edges 27 and trailing edges 28.

Each surface 25 defines:
- a pair of surfaces of minimum size opposite to each other and respectively defined by the respective leading edge 27 and trailing edge 28; and
- a pair of surfaces of maximum size opposite to each other and respectively defined by the respective top surface 29 and bottom surface 30.

In this "aeroplane" configuration, the leading edge 27 of each surface 25 is arranged in front of the trailing edge 28 of the same surface 25, proceeding along the axis A.

In this way, the chords of the surfaces 25 are arranged substantially parallel to axis A and orthogonal to axis Z.

The surfaces 25 thus expose the respective surfaces of minimum size defined by the respective leading edges 27 transversely to axis A, i.e. to the airflow.

The surfaces 25 also expose the respective surfaces of maximum size substantially parallel to the direction of the airflow, substantially parallel to axis A, and substantially orthogonal to axis Z.

Contrariwise, in the "helicopter" configuration, the leading edges 27 and trailing edge 28 are arranged orthogonally to axes A and Z and preferably parallel to axis E. In this way, the chords of the surfaces 25 are arranged substantially orthogonal to axes A and Z and parallel to axis E, thereby reducing interference of the surfaces 25 with the downwash of the respective rotors 5.

In other words, the surfaces 25 expose the respective surfaces of minimum size defined by the respective leading edges 27 and trailing edges 28 orthogonally to axis Z and, therefore, parallel to the wash of the respective rotors 5.

The surfaces 25 also expose the respective surfaces of maximum size defined by the respective top surfaces 29 and bottom surfaces 30 transversely to axis A.

In particular, plane P is parallel to axes A and Z, and orthogonal to axis E.

Each rotor 5 basically comprises:
a mast 9 rotatable about an axis B;
a hub 7 driven in rotation by the mast 9; and
a plurality of blades 8a, 8b hinged on the hub 7.

The axis E is transversal to axis A and axes B.

Since the rotors 5 are identical, reference will be made hereinafter to a single rotor 5.

The blades 8a, 8b comprise respective free tips 17 opposite to axis B.

In particular, each blade 8a, 8b comprises:
a root portion 18 hinged on the hub 7; and
a main portion 19 defining a free tip 17 of the blade 8a, 8b.

In the case shown, the main portion 19 of each blade 8a, 8b has a longitudinal extension greater than the root portion 18.

The convertiplane 1 can also be arranged in a stowage configuration (shown in FIGS. 1, 6 and 7), where the space occupied along the axis E is particularly small.

Preferably, the convertiplane 1 is arranged in the stowage configuration starting from the "helicopter" configuration.

Advantageously, portion 22 of each wing 3 is hinged to the associated portion 20 about a respective axis I (FIGS. 2 to 11), and is movable with respect to portion 20 during the transformation of the convertiplane 1 from the "helicopter" configuration to the stowage configuration so as to fold the respective wing 3 about the respective axis I.

In greater detail, each portion 22 and the associated portion 21 form an assembly 23, which is folded with respect to the associated portion 20 and about the associated axis I, during the transformation of the convertiplane 1 from the "helicopter" configuration to the stowage configuration.

More specifically, the assemblies 23 describe, in the case shown, a motion of pure rotation about the respective axes I during the transformation of the convertiplane 1 from the "helicopter" configuration to the stowage configuration.

Referring to the stowage configuration (FIGS. 6 and 7), at least portions 22 of the assemblies 23 are arranged in a mutually convergent manner, proceeding from the respective portion 20 towards the tail portion 13.

Always referring to the stowage configuration, at least portions 22 of the assemblies 23 are arranged in an upward manner, proceeding from the tail portion 13 towards the nose 12.

In particular, axes I are positioned in such a way that the assemblies 23 do not interfere with the tail portion 13 when the convertiplane 1 is arranged in the stowage configuration.

In the case shown, axes I are incident with each other on plane P.

More specifically, axes I are mutually convergent on the side opposite to the undercarriage 6 with respect to the fuselage 2.

In this way, the assemblies 23 are simultaneously rotated backwards about axis A towards the tail portion 13, at first upward with respect to portion 20 and then downward with respect to portion 20.

Alternatively, axes I are orthogonal to axes A and E, and are arranged along high-low direction.

In a further embodiment, which is not shown, axes I are mutually convergent on the side of the undercarriage 6.

The space occupied by the folded wings 3 parallel to axis A, is within the space occupied by the canards 14 and the tail portion 13.

The main portions 19 of the blades 8a, 8b of the rotors 5 have respective axes H of longitudinal extension orthogonal to axis B when the convertiplane 1 is arranged in the "aeroplane" or "helicopter" configurations.

In other words, the root portions 18 and the respective main portions 19 are contiguous with one another along the respective axes H, when the convertiplane 1 is arranged in the "aeroplane" or "helicopter" configurations.

The main portion 19 of each blade 8a, 8b is hinged with respect to the associated root portion 18 about a respective axis K parallel to axis B.

In this way, during the transition of the convertiplane 1 from the "helicopter" configuration to the "stowage" configuration, a blade 8a of each rotor 5 is arranged parallel to axis E and the main portions 19 of the remaining blades 8b of the rotor 5 are folded towards blade 8a.

Finally, in the "stowage" configuration, the leading edges 27 of the surfaces 25 are arranged above the respective trailing edges 28, when seen from above in plan, so as to further reduce the dimensions parallel to axis E.

In other words, the surfaces 25 show the respective chords and, in consequence, expose the respective surfaces of maximum size orthogonally to axis A, and parallel to axes A and Z.

It is important to stress that the rotation of the assemblies 23 with respect to portions 20 of the respective wings 3 is prevented during normal operating conditions of the convertiplane 1 and is only allowed when the convertiplane 1 must be arranged in the stowage configuration.

Similarly, the rotation of the main portions 19 of the blades 8b with respect to the associated root portions 18 is prevented during normal operating conditions of the convertiplane 1 and is only allowed when the convertiplane 1 must be arranged in the stowage configuration.

The folding method of the convertiplane 1 is described below in detail with reference to FIGS. 2 to 7, starting from the "helicopter" configuration of the convertiplane 1 shown in FIG. 2.

Starting from the "helicopter" configuration, the blades 8a of the rotors 5 are arranged with the respective axes H mutually parallel and placed over the wing 3 substantially parallel to axis E. The main portions 19 of the blades 8b of the rotors 5 are folded about the respective axes K towards the associated blades 8a.

In particular, the main portions 19 of the blades 8b of the rotors 5 are folded toward axis A symmetrically to the respective blade 8a.

In other words, blade 8a and the main portions 8b are interposed along the axis E between the axes B of the rotors 5 arranged in the "helicopter" configuration.

Then (FIG. 4), the tip portions 21 with the respective rotors 5 are rotated about axis E so as to arrange the convertiplane 1 in the "aeroplane" configuration, but with the main portions 19 of the blades 8b folded towards axis A and towards the associated blades 8a.

At this point (FIG. 5), the assemblies 23 are rotated about the respective axes I, with respect to the associated portions 20 of the corresponding wings 3 and towards the tail portion 13.

During this rotation, the assemblies 23 are raised on the side opposite to the undercarriage 6 and moved towards the tail portion 13 with respect to portions 20 of the respective wings 3. The engines 4, instead, remain integral with the fuselage 2 and portions 20 of the respective wings 3.

Furthermore, portions 22, 21 of each assembly 23 remain integral with one another.

During this rotation, the assemblies 23 are arranged on respective mutually opposite sides of the fuselage 2.

Finally, during this rotation, the leading edges 27 are arranged above the trailing edges 28 so that the chords of the surfaces 25 extend transversely to axes A and E, and to axis Z. More specifically, the angle between the chords of the surfaces 25 and axes A and E is greater than forty-five degrees, and the angle between the chords of the surfaces 25 and axis Z is less than forty-five degrees.

In consequence, the surfaces 25 expose the surfaces of minimum size parallel to axis A.

At the end of this rotation, the convertiplane 1 is arranged in the stowage configuration.

Figure 6:
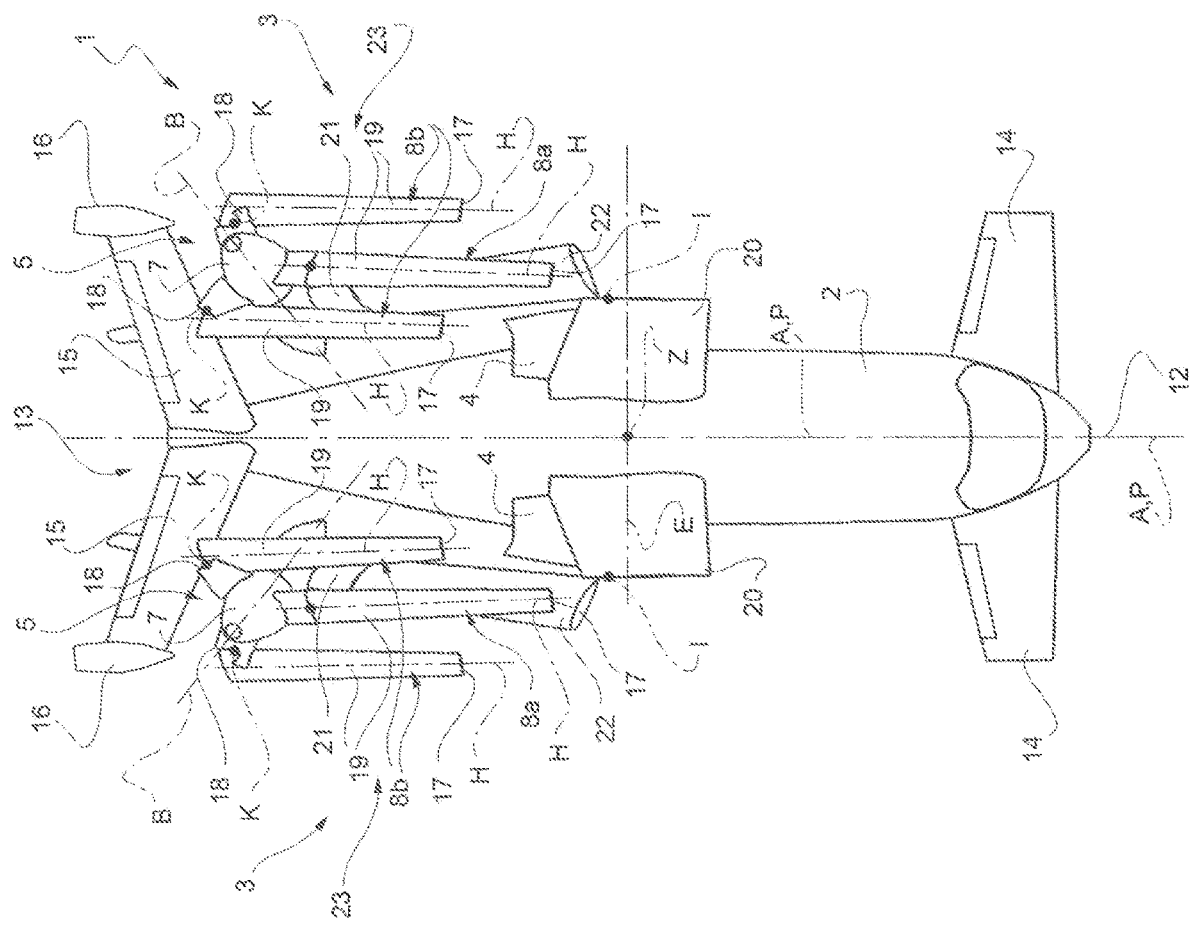
FIG. 6 is a top view of the convertiplane in FIGS. 1 to 5 during a fourth operating step of the first embodiment of the associated folding method.
Figure 7:
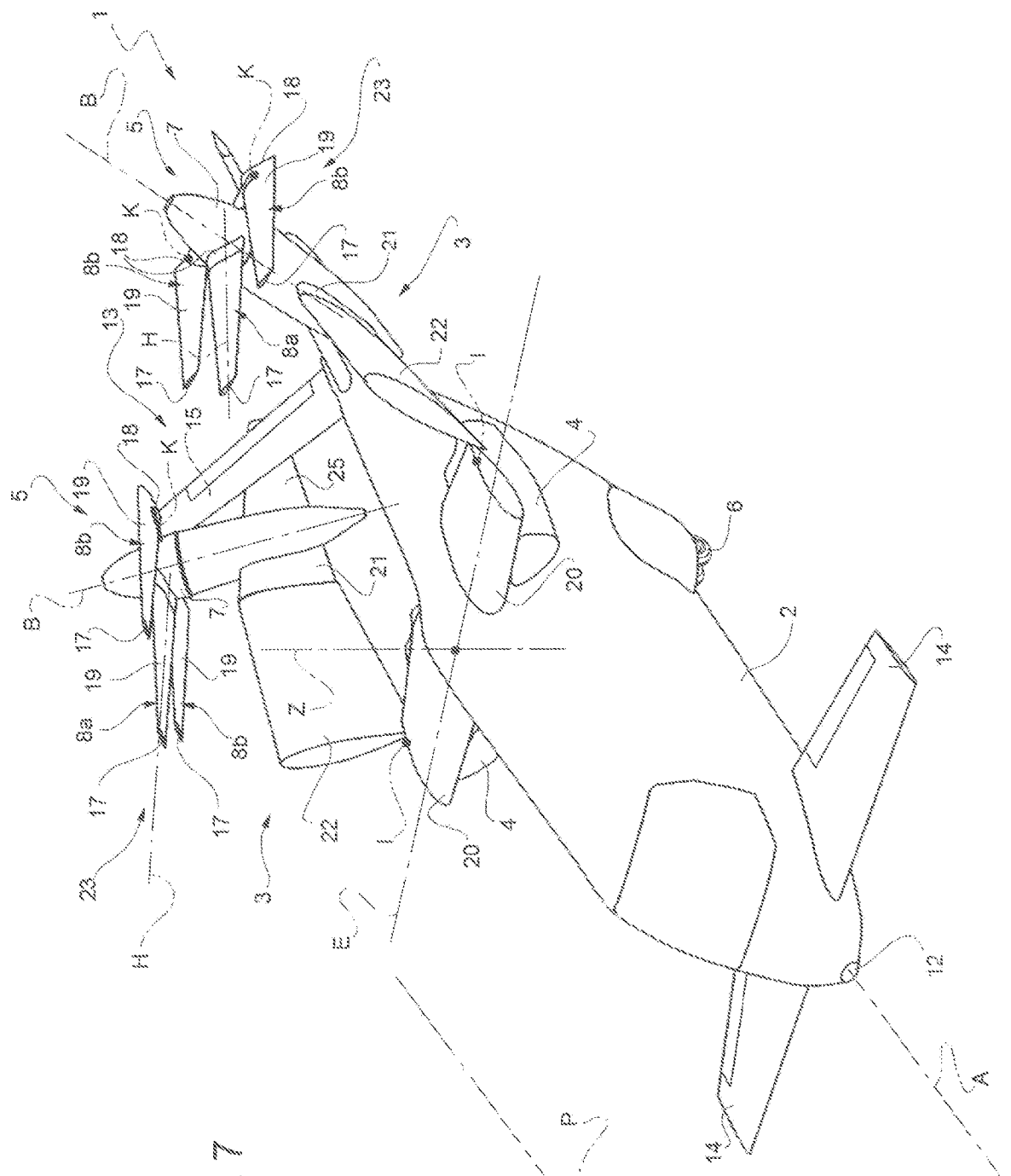
FIG. 7 is a perspective view of the convertiplane in FIGS. 1 to 6 during a fourth operating step of the first embodiment of the associated folding method.

In greater detail, portions 22 of the assemblies 23 are arranged in a mutually convergent manner, proceeding from the tail portion 13 towards the nose 12 of the fuselage 2 and seen from above (FIG. 6).

The assemblies 23 are also arranged completely on mutually opposite sides of the fuselage 2.

Portions 22 of the assemblies 23 are also arranged in an upward manner, proceeding from the tail portion 13 towards the nose 12 of the fuselage 2.

In this stowage configuration, the space occupied by the convertiplane 1 parallel to axis E is particularly small.

In particular, the space occupied by the wings 3 folded parallel to axis A is within the space occupied by the canards 14 and the tail portion 13 parallel to axis E.

Referring to FIGS. 8 to 11, a second embodiment of the folding method according to the present invention is illustrated.

This second embodiment of the folding method will be described below only in relation to how it differs from the first embodiment shown in FIGS. 1 to 7.

Figure 8:
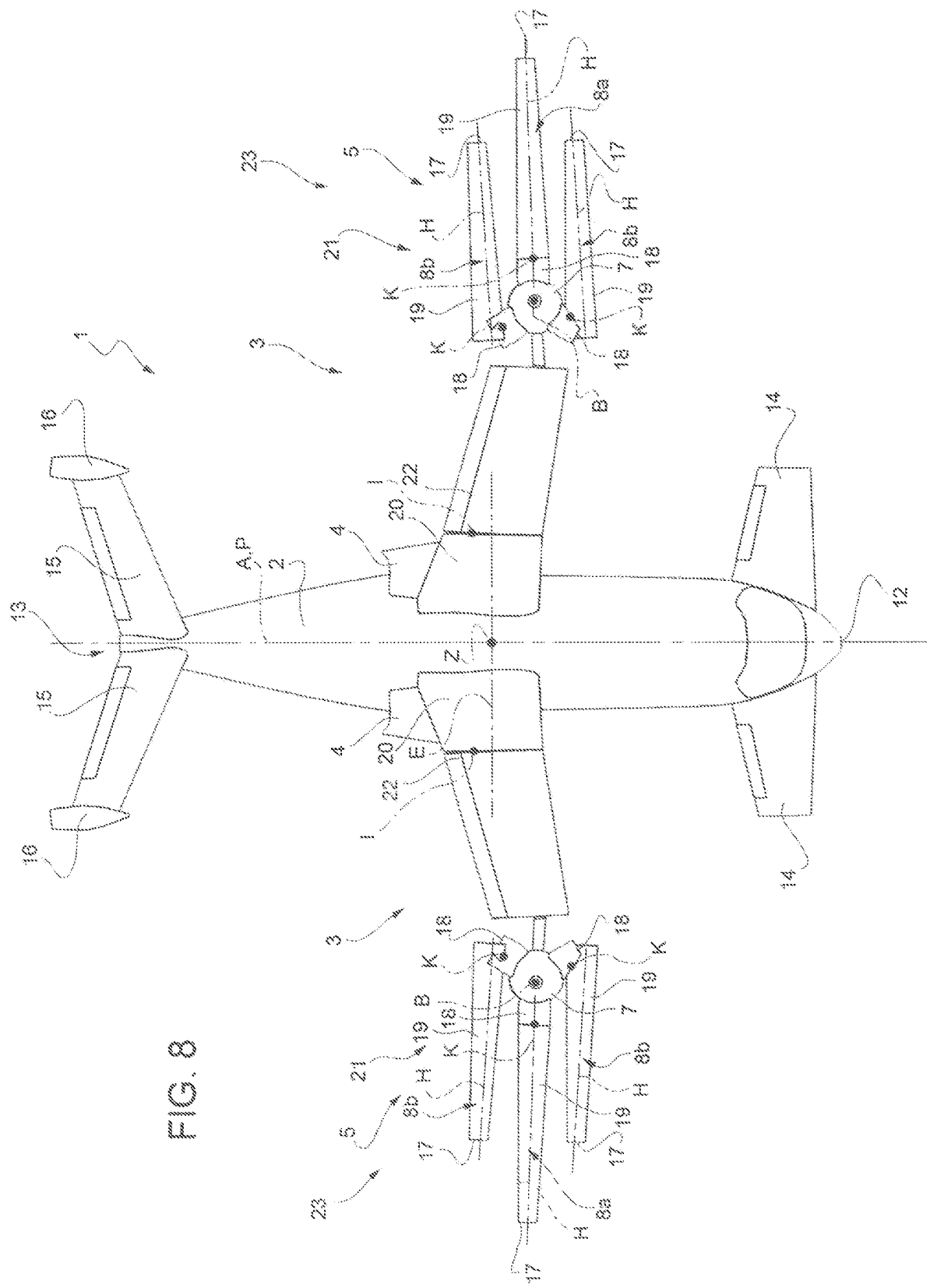
FIG. 8 is a plan view of the convertiplane in FIGS. 1 and 7 during a first operating step of a second embodiment of the associated folding method.

According to this second embodiment of the folding method, starting from the "helicopter" configuration, blades 8a and the main portions 19 of blades 8b of the rotors 5 are arranged with the respective axes H arranged on opposite sides of the wings 3 with respect to the associated intermediate portions 21 (FIG. 8).

Figure 9:
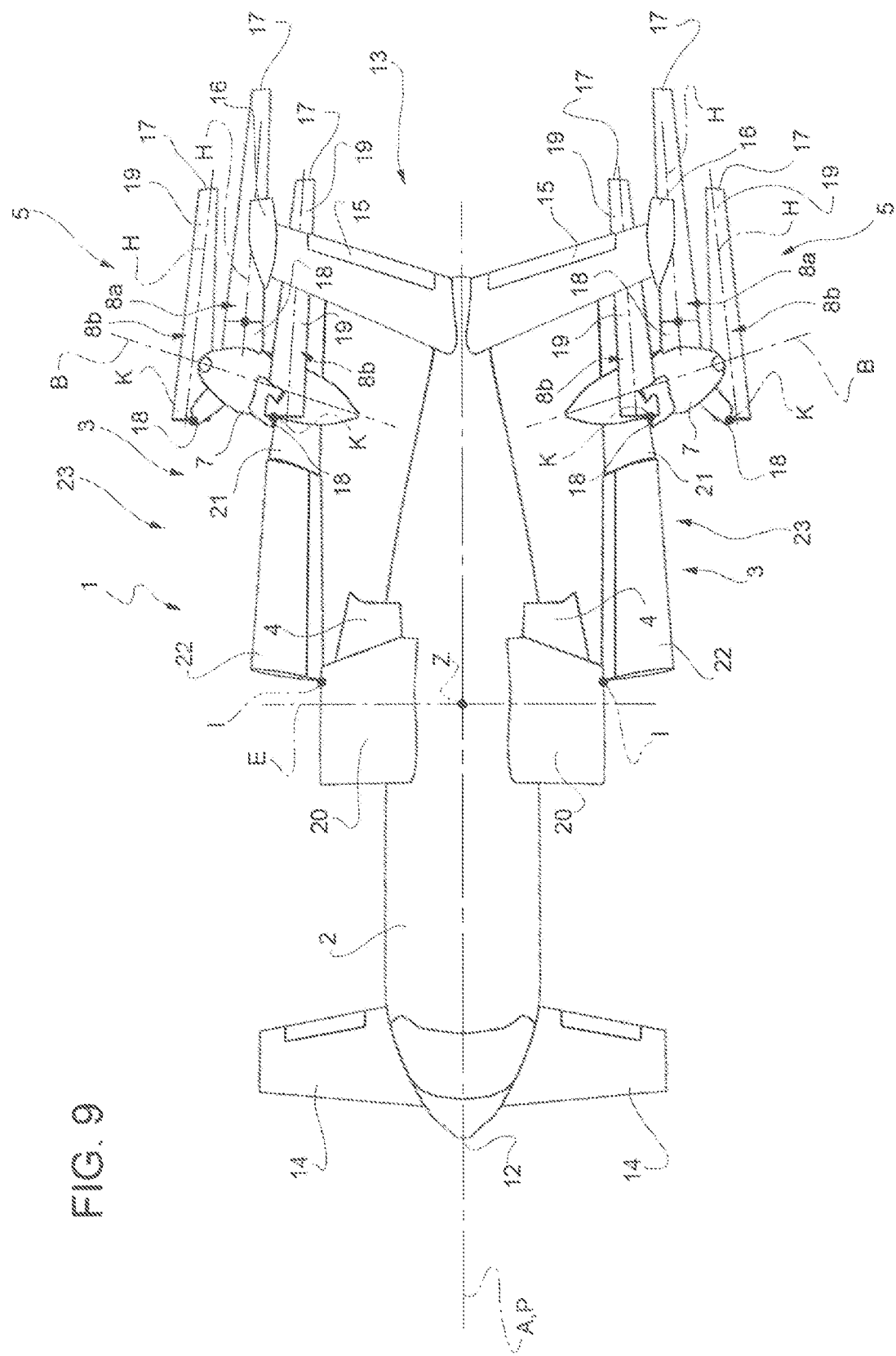
FIG. 9 is a plan view of the convertiplane in FIGS. 1 to 8 during a second operating step of the second embodiment of the associated folding method according to the principles of the invention.
Figure 10:
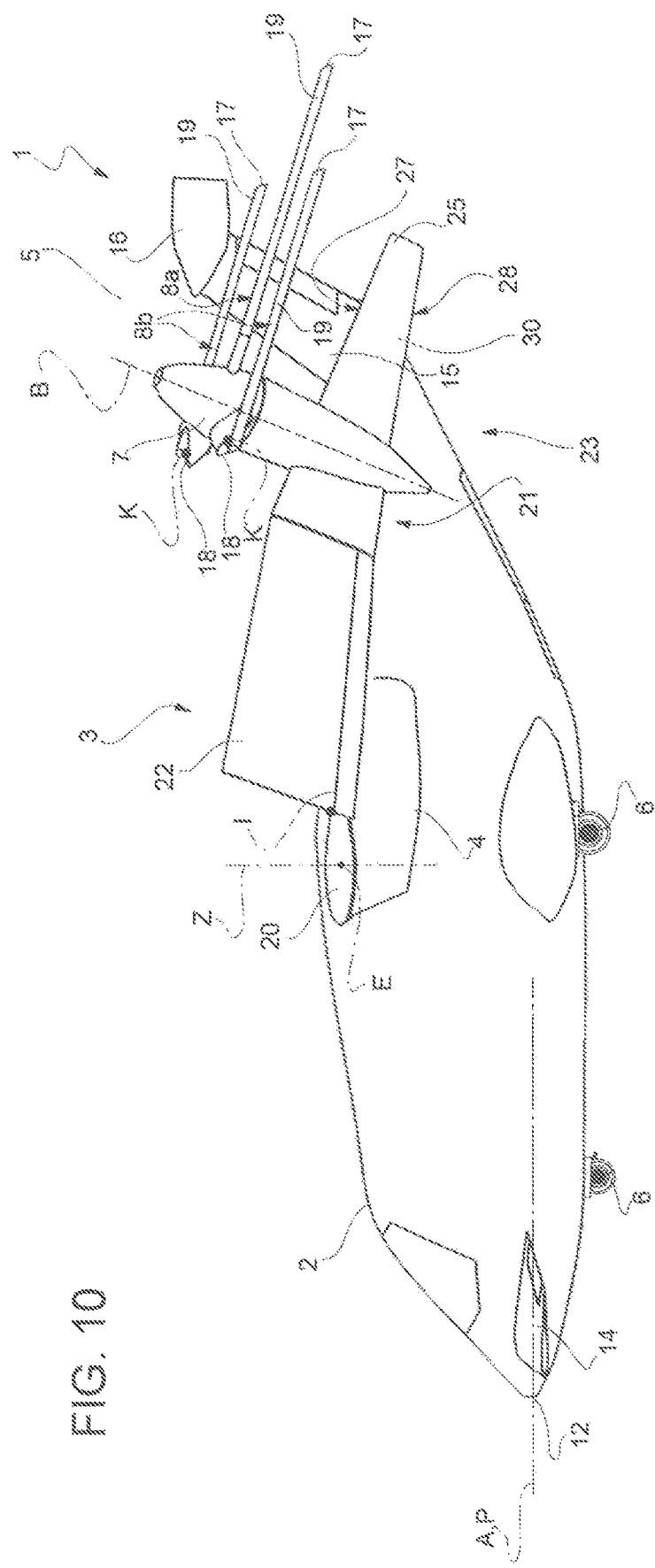
FIG. 10 is a side view of the convertiplane in FIGS. 1 to 9 during a third operating step of the second embodiment of the associated folding method.
Figure 11:
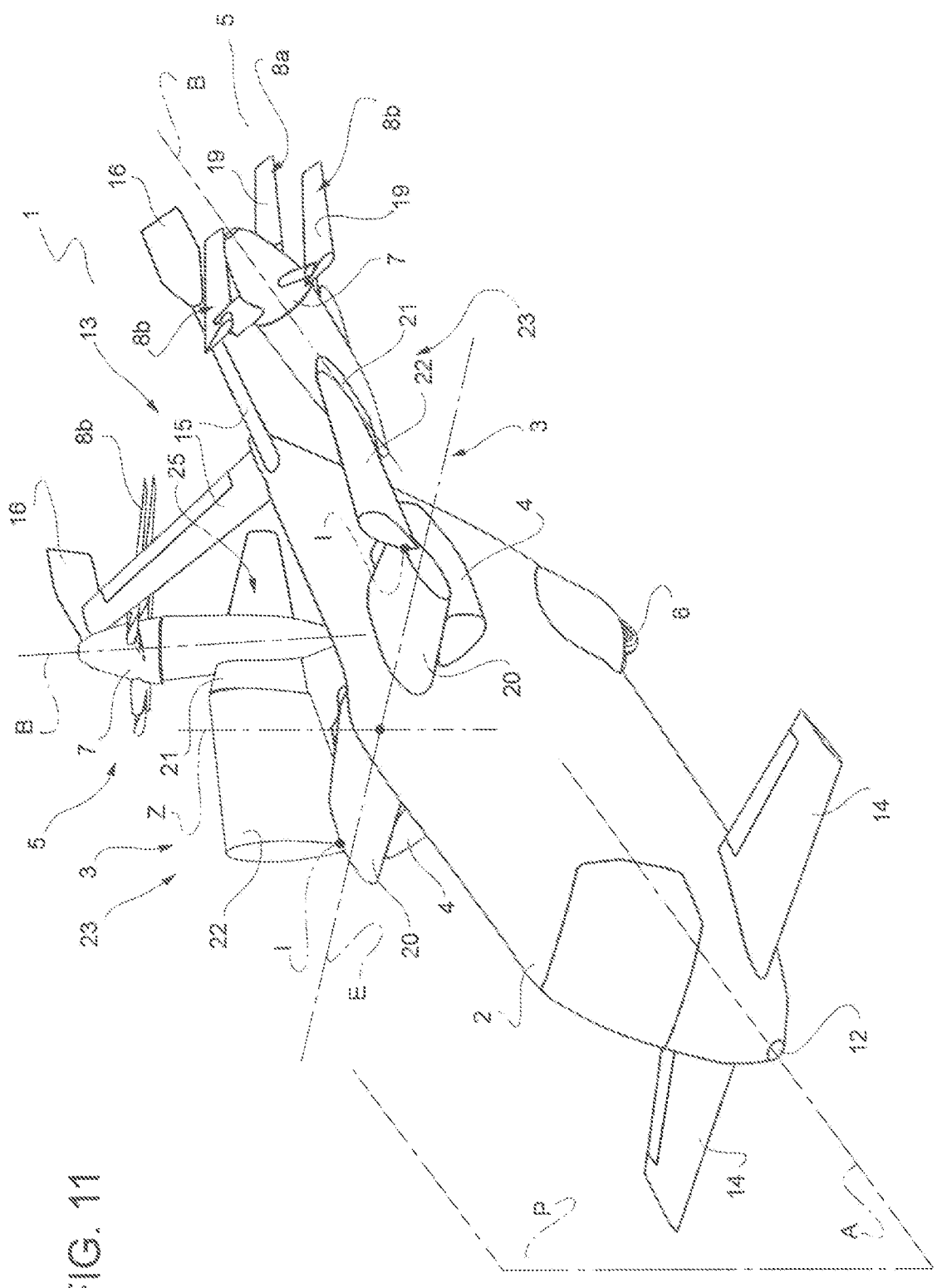
FIG. 11 is a perspective view of the convertiplane in FIGS. 1 to 10 during the third operating step of the second embodiment of the associated folding method.

Then, the assemblies 23 are rotated about the respective axes I with respect to the respective portions 20 of the wings 3 and towards the tail portion 13 until the convertiplane 1 is arranged in the stowage configuration (FIGS. 9 to 11).

In this stowage configuration, blade 8a and the main portions 19 of blades 8b of the rotors 5 extend mainly towards the tail portion 13, respectively from the respective axis B and from the respective root portions 18.

Referring to stowage configuration (FIGS. 10 and 11), at least portions 22 of the assemblies 23 are arranged in a mutually divergent manner, proceeding from the tail portion 13 towards the nose 12 and seen from above.

Finally, in the stowage configuration, as shown in FIG. 11, the fins 16 are interposed between the main portions 19 of the blades 8a, 8b of the rotors 5.

In other words, the volume delimited by the fins 16 parallel to axis E is free from the main portions 19 of the blades 8a, 8b of the rotors 5.

Figure 12:
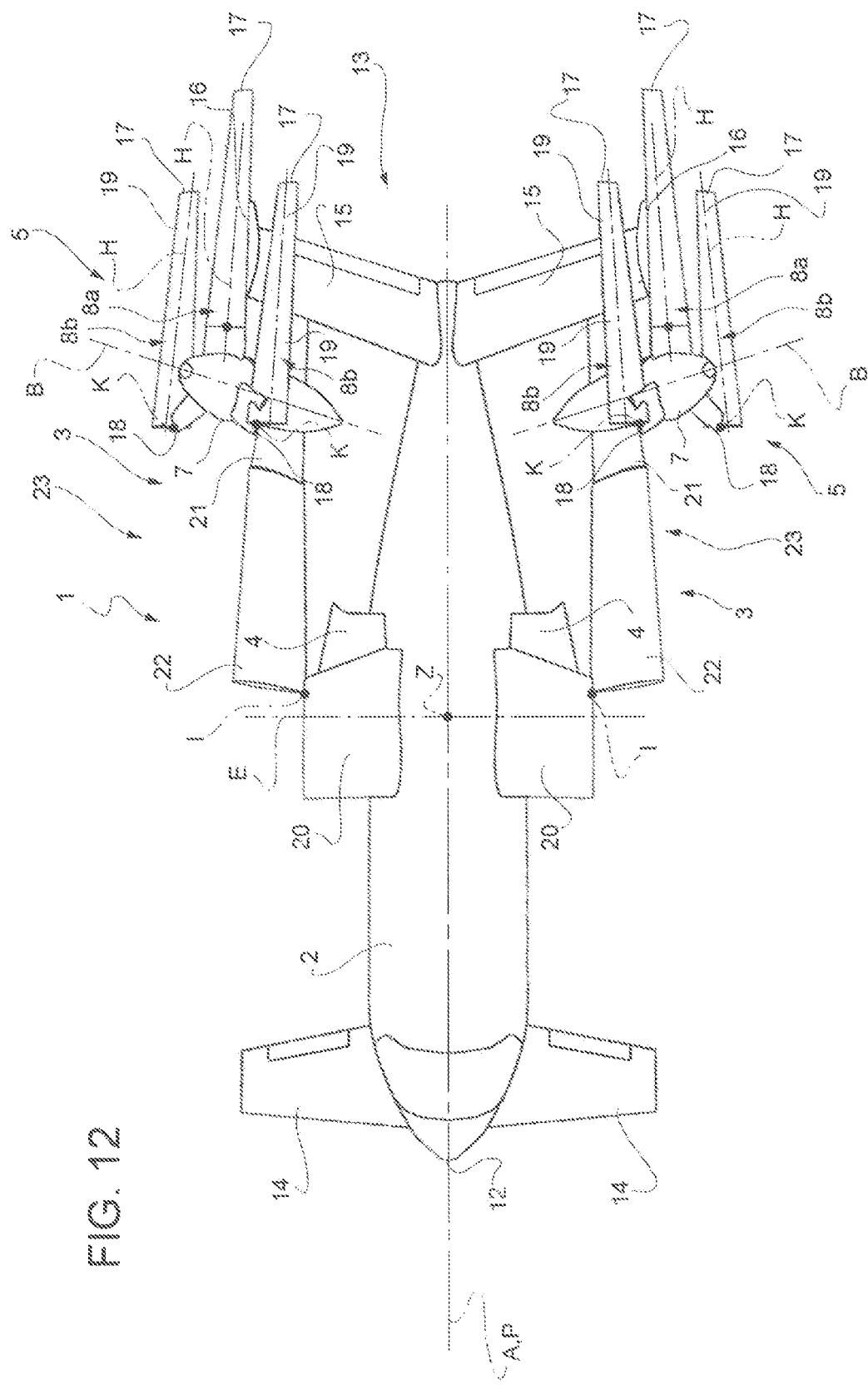
FIG. 12 is a top view of the convertiplane in FIGS. 1 to 11 at the end of a folding operation performed according to a third embodiment of the associated folding method according to the principles of the invention.
Figure 13:
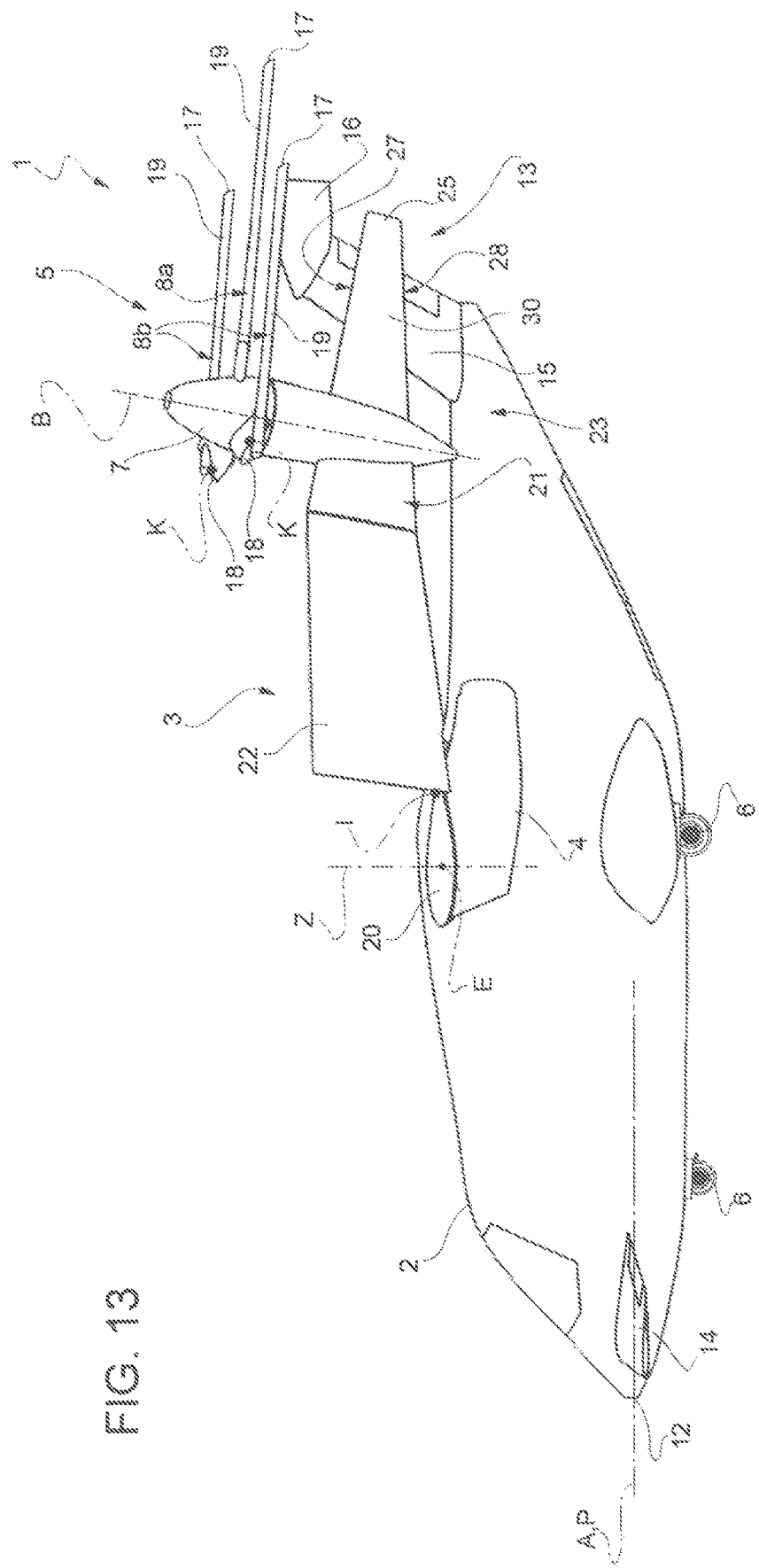
FIG. 13 is a top view of the convertiplane in FIG. 12 at the end of a folding operation performed according to the third embodiment of the associated folding method.

Referring to FIGS. 12 and 13, a third embodiment of the folding method according to the present invention is illustrated.

This third embodiment of the folding method will be described below only in relation to how it differs from the second embodiment shown in FIGS. 8 to 11.

According to this third embodiment of the folding method, in the stowage configuration, the main portions 19 of the blades 8a, 8b of the rotors 5 are arranged, in plan view, above the fins 16, i.e. on the opposite side of the fins 16 with respect to the fuselage 2, with reference to axis Z (FIG. 13).

With special reference to FIG. 12, in plan view and in the aforementioned stowage configuration:

the main portion 19 of one of blades 8b of each rotor 5 is interposed between the relevant fin 16 and the line of axis A;

the main portion 19 of blade 8a of each rotor 5 is arranged on the opposite side of the relevant fin 16 with respect to the line of axis A; and the main portion 19 of the blade 8b of each rotor 5 is arranged on the opposite side of the main portion 19 of the blade 8a with respect to the relevant fin 16.

In other words, each fin 16 is interposed, in plan, between the main portion 19 of blade 8a and the main portion 19 of one of blades 8b.

Figure 14:
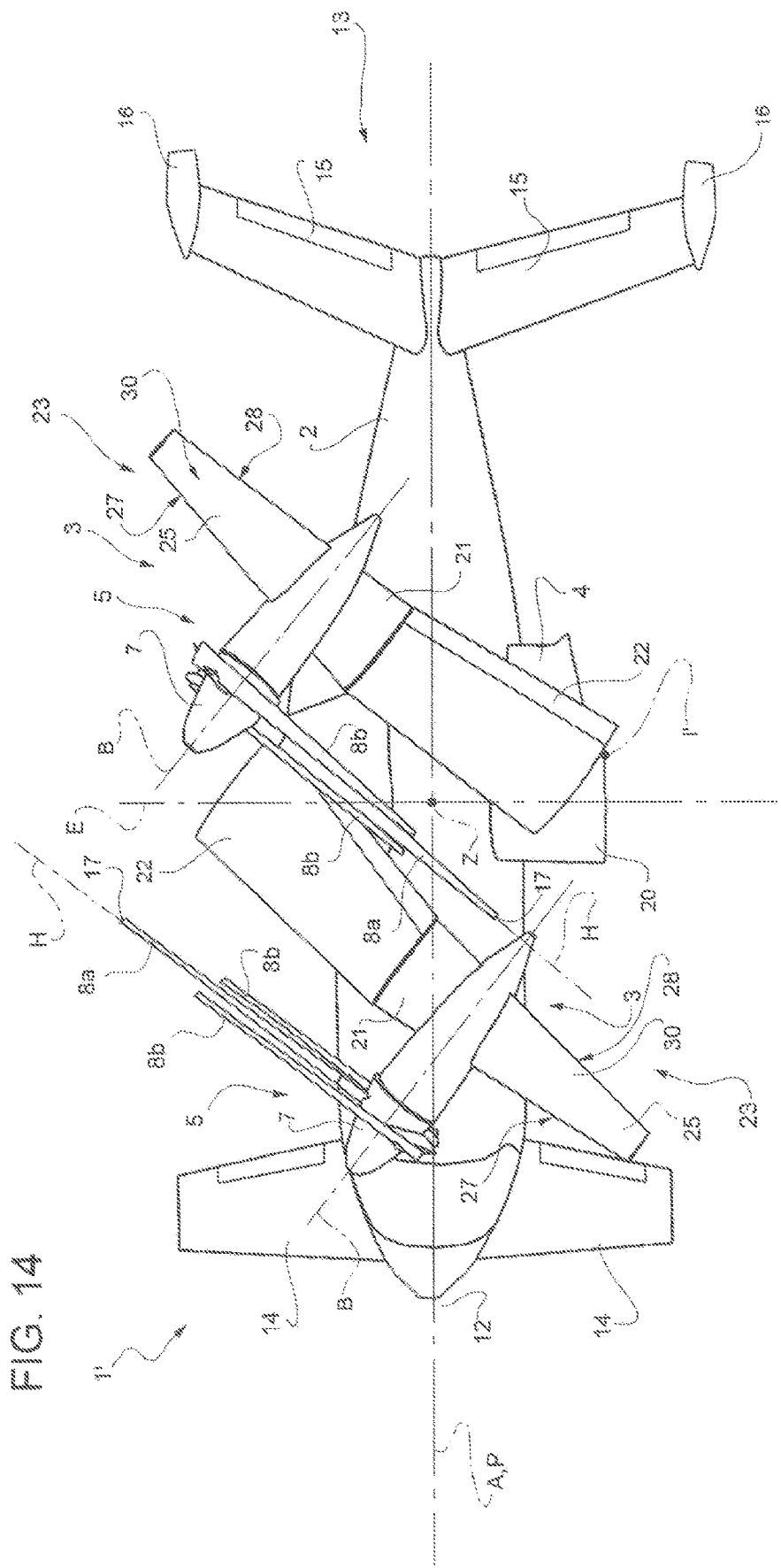
FIG. 14 is a top view of a further embodiment of the convertiplane according to the principles of the present invention at the end of a folding operation performed according to a fourth embodiment of the associated folding method according to the principles of the present invention.

Referring to FIG. 14, a convertiplane 1' according to a further embodiment of the present invention and a folding method according to a fourth embodiment of the present invention are illustrated.

Convertiplane 1' and the folding method according to the fourth embodiment of the present invention will be described below only in relation to how they respectively differ from convertiplane 1 and the first embodiment shown in FIGS. 1 to 7.

Convertiplane 1' differs from convertiplane 1 in that the axes I' are mutually skew and transversal to axis A.

The method according to the fourth embodiment is similar to the method according to the first embodiment in relation to the steps shown in FIGS. 1 to 4.

Figure 4:
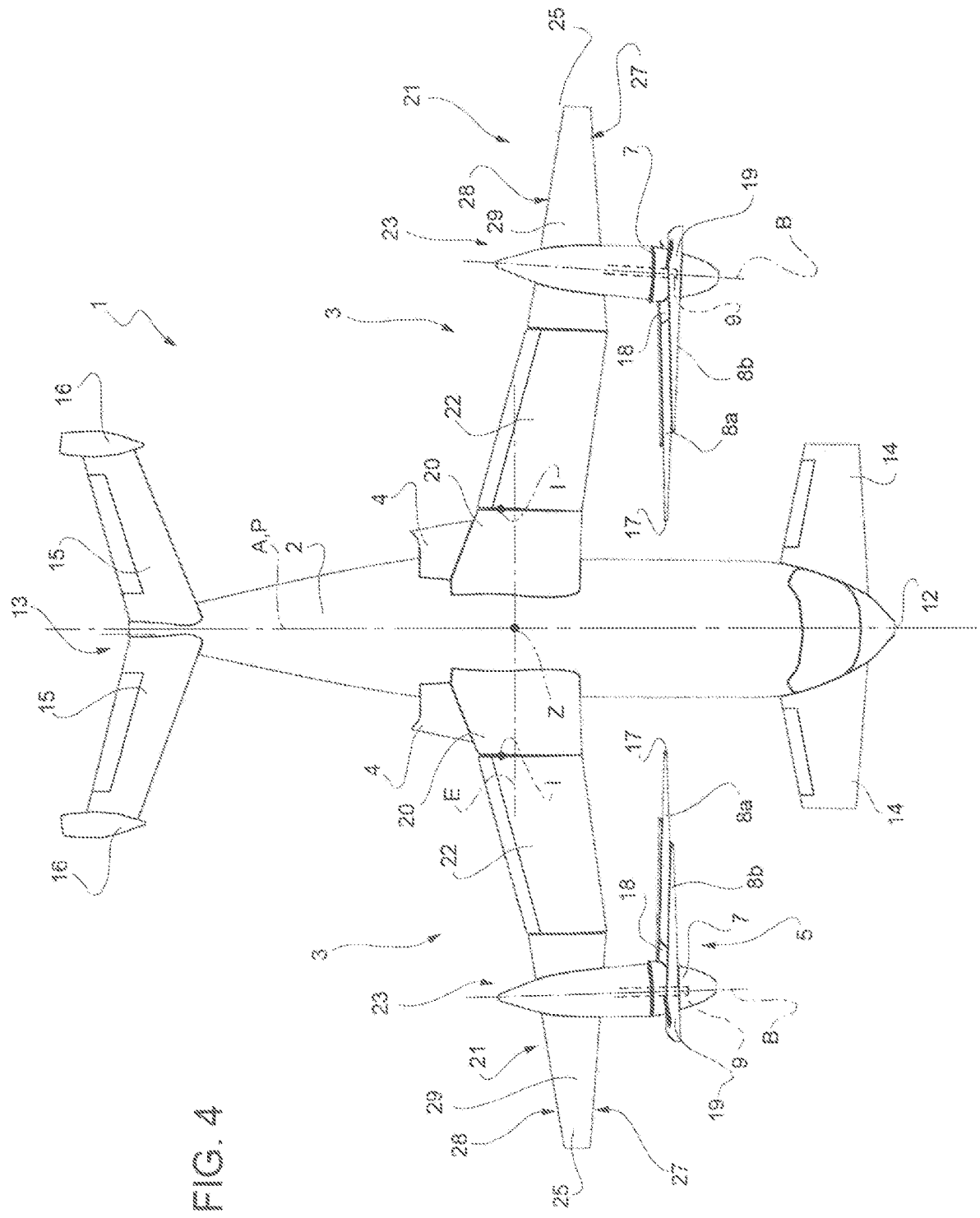
FIG. 4 is a top view of the convertiplane in FIGS. 1 to 3 during a second operating step of the first embodiment of the associated folding method.
Figure 5:
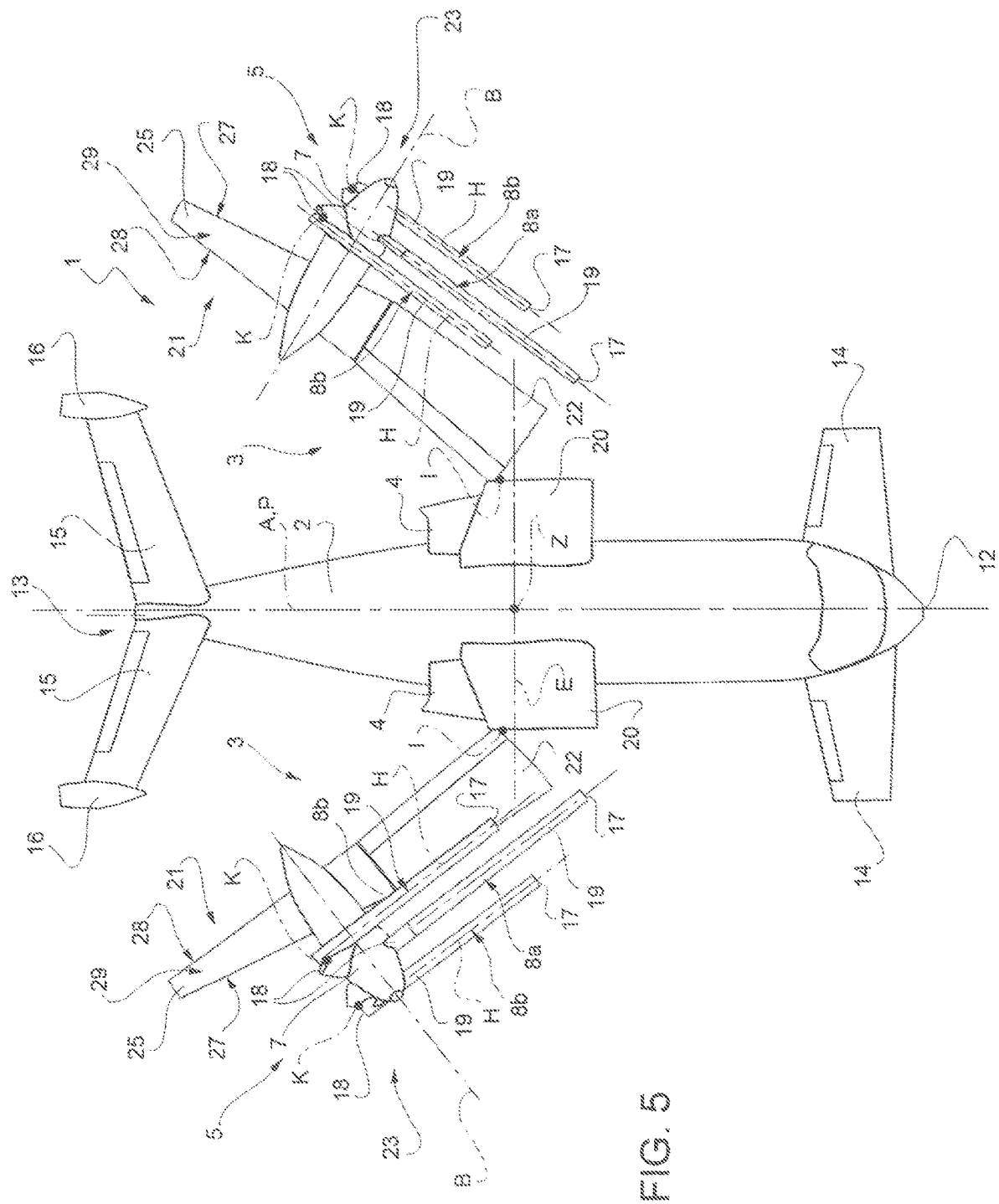
FIG. 5 is a top view of the convertiplane in FIGS. 1 to 4 during a third operating step of the first embodiment of the associated folding method.

Moreover, the method according to the fourth embodiment differs from the method according to the first embodiment in that starting from the configuration in FIG. 4, the assemblies 23 are folded about the respective axes I' so as to become, in the stowage configuration, placed over the fuselage 2 on the side opposite to the undercarriage 6.

In greater detail, the assemblies 23 lay side by side, i.e. portions 21, 22 of the assemblies 23 have respective directions of extension preferably parallel to each other.

A forward wing 3 is folded about the associated front axis I' so that the associated assembly 23 extends towards the nose 12, proceeding from the associated portion 20 towards the corresponding tip portion 21.

The other, rearward wing 3 is folded about the associated rear axis I' so that the associated assembly 23 extends towards the tail portion 13, proceeding from the associated portion 20 towards the corresponding tip portion 21.

In the stowage configuration shown in FIG. 14, blade 8a of each rotor 5 extends towards portion 21 of the respective wing 3. Moreover, the main portions 19 of blades 8b of each rotor 5 are folded about the associated axes K towards portion 21 of the respective wing 3. Finally, in the stowage configuration, the assemblies 23 are flipped over by an obtuse angle, preferably greater than 135 degrees with respect to portions of the associated wings 3, with respect to the configuration in FIG. 4.

In the stowage configuration shown in FIG. 14, each surface 25 has the respective top surface 29 facing towards the fuselage 2 and the respective bottom surface 30 facing substantially upwards.

Figure 15:
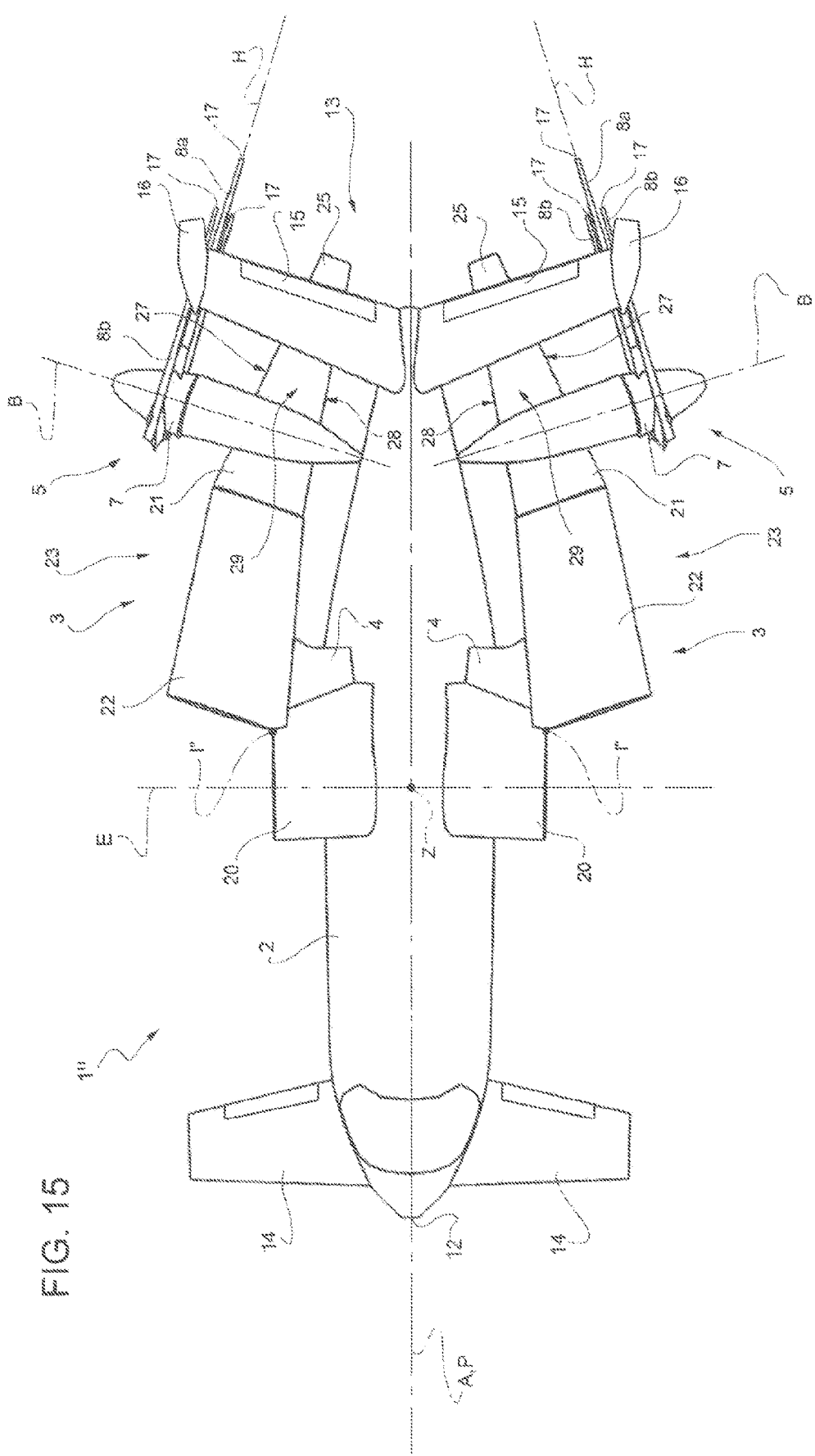
FIG. 15 is a top view of a further embodiment of the convertiplane according to the principles of the present invention at the end of a folding operation performed according to a fifth embodiment of the associated folding method according to the principles of the present invention.

Referring to FIG. 15, a convertiplane 1″ according to a further embodiment of the present invention and a folding method according to a fifth embodiment of the present invention is illustrated.

Convertiplane 1″ and the folding method according to the fifth embodiment of the present invention will be described below only in relation to how they respectively differ from convertiplane 1 and the first embodiment shown in FIGS. 1 to 4.

Convertiplane 1″ differs from convertiplane 1 in that the axes I″ are parallel to each other, parallel to axis Z and orthogonal to the plane defined by axes A and E.

The folding method according to the fifth embodiment is similar to the method according to the first embodiment in relation to the steps shown in FIGS. 1 to 4.

Moreover, the method according to the fifth embodiment differs from the method according to the first embodiment in that, starting from the configuration in FIG. 4, the assemblies 23 are folded about the respective I″ so as to become, in the stowage configuration, rotated towards the tail portion 13 of the convertiplane 1″ starting from the respective portions 20.

Due to the arrangement of axes I″, in the stowage configuration, the assemblies 23 extend laterally to the respective sides of the fuselage 2 and substantially parallel thereto.

Furthermore, the main portions 19 of the blades 8a, 8b are arranged below the respective surfaces 15 of the tail portion 13 in the stowage configuration.

Finally, when the convertiplane 1″ is in the stowage configuration, the leading edge 27 and the trailing edge 28 of each assembly 23, in particular of each portion 22, lie on a same plane defined by axes A and E and orthogonal to plane P.

In other words, the chords of portions 22 of the wings 3 are substantially coplanar with the plane defined by axes A and E and with the chords of the respective portions 20, and arranged horizontally in the plan view in FIG. 15.

According to an alternative that is not shown, the surfaces 25 expose, in the stowage configuration, the respective surfaces of minimum size defined by the respective leading edge 27 and trailing edge 28 orthogonally to axis Z.

From examination of the characteristics of the convertiplane 1, 1′, 1″ and of the folding method according to the present invention, the advantages that can be attained therewith are evident.

In particular, the assemblies 23 of the wings 3 are hinged to the respective portions 20 about respective axes I, I′ I″ and are folded with respect to portions 20.

In this way, it is possible to arrange the convertiplane 1, 1′, 1″ in the stowage configuration without having to rotate the wings 3 as a single body with respect to the fuselage 2.

In consequence, unlike the known solutions described in the introductory part of this description, the convertiplane 1, 1′, 1″ does not require complex systems to constrain the wings 3 to the fuselage 2 during normal operation and to allow rotation with respect to the fuselage 2 during the transition to the "stowage" configuration.

Since the assemblies 23 converge towards each other and are arranged in an upward manner, proceeding from the tail portion 13 towards the nose 12 of the fuselage 2, the overall dimensions of the convertiplane 1 in the "stowage" configuration are particularly compact.

Due to the fact that axes I are incident on plane P, the rotation of the assemblies 23 about the associated axes I causes first the raising of the assemblies 23 with respect to the associated portions 20 and then the lowering of the assemblies 23 with respect to the associated portions 20 upon reaching the stowage configuration. In consequence, the size of the convertiplane 1 in the stowage configuration and parallel to axis E is particularly compact.

In particular, the space occupied by the wings 3 folded parallel to axis E is within the space occupied by the canards 14 and by the tail portion 13 parallel to axis E.

Furthermore, the engines 4 are carried by portions 20 of the respective wings 3 and, in consequence, do not rotate during the transition of the convertiplane 1 from the "helicopter" configuration to the "stowage" configuration. This makes the transition particularly straightforward, as it is not necessary to move the considerable weight of the engines 4.

Finally, in the stowage configuration, the leading edges 27 of the surfaces 25 are superimposed on the respective trailing edges 28 so that the respective chords are arranged transversely to axis Z, so as to further minimize the space occupied by the convertiplane 1 parallel to axis E.

Referring to FIG. 14, convertiplane 1′ and the folding method according to the fourth embodiment have the following advantages.

Due to the fact that each assembly 23 is folded above the fuselage 2, the lateral sides of the latter are completely free in the stowage configuration. In consequence, lateral access to the fuselage 2 is simplified for carrying out operations of loading/unloading materials on/from convertiplane 1′.

Furthermore, in the stowage configuration the assemblies 23 are arranged below the tail portion 13 along the axis Z. In consequence, convertiplane 1′ has the same maximum dimension—namely the same maximum height—along the axis Z in the stowage configuration and in the "aeroplane" and "helicopter" operating configurations.

In the stowage configuration, the lower portion of the fuselage 2 adjacent to the undercarriage 6 is free from the assemblies 23 of convertiplane 1′. In consequence, loading it on a trailer or sled is particularly simplified.

It is clear that modifications and variants can be made to the convertiplane 1, 1′, 1″ and the method set forth herein without departing from the scope defined in the claims.

In particular, each tip portion 21 might not comprise a section adjacent to the respective portion 22. In this case, each tip portion 21 would only comprise the respective rotor 5 with the respective nacelle 10, the respective surface 25 and the respective free end.

Moreover, portions 22 of the wings 3 could be hinged to the respective portions 20.

The invention claimed is:

The invention claimed is:
1. A method of folding a convertiplane (1, 1′, 1″), said convertiplane (1, 1′, 1″), in turn, comprising:
a fuselage (2) having a first longitudinal axis (A);
a pair of wings (3); and
at least a pair of rotors (5) arranged on respective mutually opposite sides of the respective said wings (3);
each said rotor (5) comprising a mast (9) rotatable about a second axis (B) and a plurality of blades (8a, 8b) hinged to said mast (9) with respect to said second axis (B);

each said wing (3), in turn, comprising:
- a first portion (20), fixed with respect to said fuselage (2);
- a second tip portion (21) opposite to said first portion (20); and
- a third intermediate portion (22), which is interposed between the associated said first portion (20) and the associated said second tip portion (21);

said mast (9) of each said rotor (5) being integrally tiltable with said second axis (B) and the associated said second tip portion (21) about an associated third axis (E) transversal to said second axis (B) and with respect to said fuselage (2), so as to set said convertiplane (1, 1', 1") between a helicopter configuration and an aeroplane configuration;

each said second axis (B) being, in use, transversal to said first axis (A) of said convertiplane (1, 1', 1") in said helicopter configuration and being, in use, substantially parallel to said first axis (A) in said aeroplane configuration;

said method comprising the steps of:
i) arranging said convertiplane (1, 1', 1") in said helicopter configuration;
ii) rotating an assembly (23) of each said wing (3) with respect to said fuselage (2) and the associated said first portion (20) about a respective said fourth axis (I, I', I"), so as to fold said respective said wing (3) and arrange said convertiplane (1, 1', 1") in a stowage configuration;

each said assembly (23) being formed by a second tip portion (21) and by the associated said third intermediate portion (22); and
iii) folding said assemblies (23) above said fuselage (2) and in staggered positions along said first axis (A).

2. The method according to claim 1, characterized in that step iii) comprises the steps of:
iv) folding the assembly (23) of one wing (3) towards a said-tail portion (13) of said fuselage (2), starting from an associated said first portion (20) of the corresponding wing (3); and
v) folding the assembly (23) of the other wing (3) towards a said-nose (12) of said fuselage (2), starting from an associated said first portion (20) of the corresponding wing (3).

3. A convertiplane (1, 1', 1") comprising:
- a fuselage (2) having a longitudinal first axis (A);
- a pair of wings (3); and
- at least a pair of rotors (5) arranged on respective mutually opposite sides of said wing (3);
- each said rotor (5), in turn, comprising a mast (9) rotatable about a second axis (B) and a plurality of blades (8) hinged to said mast (9) with respect to said second axis (B);

each said wing (3), in turn, comprising:
- a first portion (20), fixed with respect to said fuselage (2);
- a second tip portion (21); and
- a third intermediate portion (22), which is interposed between the respective said first portion (20) and the respective said tip portion (21);

said mast (9) of each said rotor (5) being integrally tiltable with said second axis (B) and the associated said second tip portion (21) about an associated third axis (E) transversal to said second axis (B) and with respect to said fuselage (2), so as to transform said convertiplane (1, 1', 1") between a helicopter configuration and an aeroplane configuration;

each said second axis (B) being, in use, transversal to said first axis (A) of said convertiplane (1, 1', 1") in said helicopter configuration and being, in use, substantially parallel to said first axis (A) in said aeroplane configuration;

wherein said third intermediate portion (22) of each wing (3) is hinged to said first portion (20) of the respective wing (3) about a respective fourth axis (I, I', I"), and is movable with respect to said first portion (20) of the respective wing (3) to arrange said convertiplane (1) in a stowage configuration;

wherein each said rotor (5) comprises a plurality of blades (8a, 8b) hinged to said mast (9);

each said blade (8a, 8b), in turn, comprising:
- a root portion (18) hinged to said mast (9); and
- a main portion (19) hinged about the respective root portion (18) about an associated fifth axis (K) parallel to and offset with respect to said second axis (B);

each said main portion (19) being movable with respect to the associated said root portion (18) during the transition of said convertiplane (1) from said helicopter configuration to said stowage configuration;

wherein said fourth axes (I') are skew;
a first assembly (23) being folded towards said tail portion (13) of said fuselage (2), starting from an associated said first portion (20) of the corresponding wing (3), in said stowage configuration; and
a second assembly (23) being folded towards said nose (12) of the said fuselage (2), starting from an associated said first portion (20) of the corresponding wing (3), in said stowage configuration;

said first and second assemblies (23) being folded above said fuselage (2) and in staggered positions along said first axis (A), when said convertiplane (1') is arranged in said stowage configuration.

4. The convertiplane according to claim 3, characterized in that each of the first assembly (23) and the second assembly (23) is formed by the respective said second tip portion (21) and respective said third intermediate portion (22).

* * * * *